United States Patent [19]
Giallorenzi et al.

[11] 3,963,310
[45] June 15, 1976

[54] LIQUID CRYSTAL WAVEGUIDE

[75] Inventors: Thomas G. Giallorenzi, Alexandria; Joel M. Schnur, Springfield, both of Va.

[73] Assignee: The United States of America as represented by the Secretary of the Navy, Washington, D.C.

[22] Filed: Aug. 20, 1973

[21] Appl. No.: 389,776

[52] U.S. Cl. .................. 350/160 LC; 350/96 WG
[51] Int. Cl.² ........................................ G02F 1/13
[58] Field of Search .............. 350/96 WG, 160 LC

[56] References Cited
UNITED STATES PATENTS

| 3,311,845 | 3/1967 | Koester | 350/96 WG |
| 3,694,053 | 9/1972 | Kahn | 350/150 |
| 3,695,745 | 10/1972 | Furukawa | 350/96 WG |
| 3,704,060 | 11/1972 | McNaney | 350/160 LC |
| 3,802,760 | 4/1974 | Sosnowski | 350/160 LC |
| 3,838,908 | 10/1974 | Channin | 350/160 LC |

OTHER PUBLICATIONS

Gia Russo, et al., "Electrooptic Modulation in Thin Film Waveguide," *Applied Optics*, vol. 10, pp. 2786–2788, Dec., 1971.

Sheridan, et al., "Electrooptic Switching in Low-Loss Liquid Crystal Waveguides," *Applied Physics Letters*, vol. 22, pp. 560–561, June 1, 1973.

*Primary Examiner*—Edward S. Bauer
*Attorney, Agent, or Firm*—R. S. Sciascia; Arthur L. Branning; Melvin L. Crane

[57] ABSTRACT

An optical waveguide, which combines a thin film of aligned liquid-crystal sandwiched between two dielectric plates, is capable of performing many active optical processing functions such as modulation switching and beam deflection.

7 Claims, 8 Drawing Figures

LIQUID CRYSTAL WAVEGUIDE

BACKGROUND OF THE INVENTION

This invention relates to microoptical systems and more particularly to optical waveguides.

Heretofore, optical waveguides have been formed of dielectric solid state materials wherein the optical wave is totally reflected along a path in which the optical medium has an index of refraction which is greater than the adjacent mediums. Such waveguides have been set forth in an article, "Light Waves In Thin Films and Integrated Optics" by P. K. Tien, Applied Optics, 10, page 2395, 1971. Passive optical microcircuits having thin-film lenses, prisms, etc. have been constructed and have demonstrated that passive optical processing functions can be performed in integrated optical circuits. Active optical devices have been proposed; however, these have been demonstrated only in a very limited number of material waveguide systems. These devices make use of solid state waveguides as well as a liquid medium. Prior art optical waveguides can be thought of as a slab of dielectric which confines light by multiple total internal reflections. Thus, consider three media (FIG. 1(a)); a thin film ($n_1$), a substrate ($n_0$), and an unspecified medium ($n_2$). The plane wavefront is totally reflected alternately between the interfaces $S_1$ and $S_2$. For this to happen the index of refraction $n_1$ of the guiding dielectric must be greater than the indices $n_0$ and $n_2$ of the surrounding media and the angle of incidence $\theta$ must be greater than the larger of the two critical angles $\theta_{c0,2}$, where $$\theta_{c0,2} = \sin^{-1} \left( \frac{n_{0,2}}{n_1} \right) \tag{1}$$

For a given thickness 2d and indices $n_0$, $n_1$, and $n_2$ light will propagate with an angle of incidence $\theta$ only if, after two successive reflections, the wavefront is again in phase with any portion of the original wavefront that was not involved in these two reflections. If this were not the case, after many reflections wavefronts with a range of phases between 0 and $2\pi$, would add to zero amplitude or, equivalently, the wave would not propagate. The requirement implies that at an arbitrary point X the phase of one wavefront obtained from another by two successive reflections must equal the phase of the other wavefront at X without reflections, or differ by a multiple of $2\pi$. This requirement permits propagation for only discrete values of $\sigma$. Each value of $\sigma$ is associated with a mode of propagation and each mode has a characteristic velocity of propagation. As $\sigma$ increases, the velocity of propagation to the right also increases. One can associate a different effective index of refraction, which is a function of $d$, $n_1$, $n_2$ and $n_0$, for each waveguide mode.

Now consider those properties of waveguides which lead to low-loss propagation, to techniques of input and output coupling, and to opticl and switching and modulation. There is considerable discussion in the literature concerning various topological shapes of optical waveguides and their characteristics. Waveguides may be flat slabs, rectangular, cylindrical, or any other shape. Metal-clad dielectrics may not be used in optical waveguides due to the high losses. When light is reflected off a metal surface, the energy losses depend on the metal, the wavelength of the light, surface condition, polarization, and angle of incidence, and the losses are typically about 1 or 2% per reflection. Hence, metal-clad waveguides, because of the number of reflections per centimeter, are extremely lossy in the optical region. In the dielectric-clad waveguide, losses are due to absorption in the dielectrics and scattering losses. If the cladding has no absorption at the optical wavelength being propagated, then no energy is absorbed from the evanescent wave (extending into the cladding) and the waveguide suffers only from scattering losses.

The boundary between the waveguide and the surrounding media must be clean, smooth, and free from scratches inside to minimize surface scatter. Deviations of the waveguide wall by a few percent can cause a power loss of 0.5 dB/cm if the wall imperfection can be described by an exponential correlation function. Besides the lack of a flat, smooth surface, inhomogeneities in the waveguide or cladding media can also lead to significant waveguide losses. This is particularly important in the case of liquid-crystals, since the molecular alignment is affected by the walls and the lack of perfect molecular alignment can lead to large losses; these losses could be the dominant waveguide loss mechanism.

One technique of a high degree of molecular alignment involves uniform rubbing of the liquid-crystal boundaries and is referred to as the homogeneous alignment technique. This presumably scratches the surface and provides a preferred direction in which the molecules align. The homogeneous alignment technique in principle may not be compatible with low-loss waveguide fabrication. However, it is found in practice that this fabrication technique indeed does lead to the fabrication of low-loss waveguides. Another alignment technique referred to as the homeotropic alignment technique, involves the deposition of a thin film of polar atoms (surfactant) on surface. Again a preferred alignment direction is established and a high degree alignment is possible, usually at right angles to the alignment achieved by rubbing. This method seems more applicable to waveguide techniques and requirements.

To couple light into and out of a waveguide, it is necessary to change the boundary conditions. This may be done in several ways. In the prism coupler a prism is brought within a few optical wavelengths of a waveguide surface and frustrates total internal reflection at the surface. Frustrated total internal reflection or evanescent-field coupling occurs because the boundary conditions of a waveguide are modified by the presence of the prism. A second type of coupler, the grating coupler consists of a periodic structure in contact with the waveguide boundary. This structure permits momentum matching between a guided optical wave and a wave propagating in the cladding medium and provides coupling between the two waves. Both types of couplers may be fabricated using liquid-crystals.

A third technique which has proved to be the most successful in liquid-crystal waveguides is to couple into another thin film, such as a polymer film first. This thin film is brought in contact with the liquid-crystal thin film and light is coupled from the polymer thin film into the liquid-crystal thin film. An example of the use of this type of coupler is given in the article "Electrooptical Switching in Low Loss Liquid-Crystal Waveguides" by J. P. Sheridan, J. Schnur and T. G. Giallorenzi; Applied Physics Letters 22 560 (1973).

To construct active devices, the index of the waveguide media, or the determining boundary conditions, must be actively controlled by some external parameter. Once this is acheived, the construction of systems that will act as modulators, deflectors, and switches are possible.

Modulation may be achieved by electrooptic, acoustooptic, and magnetooptic phenomena. The electrooptic modulators make use of induced birefringence to cause phase changes in the optical waveguide modes. For example, in a waveguide of electrooptic material, or in a waveguide of an electrooptic substrate, the propagation factors for TE and TM modes vary differently with an applied electric field. If a TE wave is passed through a modulator, a phase shift may be induced, which causes a TE wave to be coupled to an orthogonally polarized TM mode. Viewed through an appropriate analyzer, the output is an amplitude-modulated signal. Magnetooptic modulators make use of induced optical activity instead of induced birefringence and require current-modulated signals instead of voltage-modulated signals.

Deflectors can operate either via the electrooptic or acoustooptic effect. In the case of electrooptic deflectors not used in optical waveguides, these devices are usually digital deflectors. The digital devices use the principle that the electrooptic effect rotates the plane of polarization of linearly polarized light in a suitable medium, so that a polarizing prism such as a Rochon, Wollaston, or Thompson prism deflects the beam into one of two channels. The same effect is accomplished in optical waveguides using coupled waveguides. No known exact analog of the digital deflector has been demonstrated to date in optical waveguides.

The acoustooptic deflector has the advantage of continuous deflection by electronic tuning of the acoustic frequency. The acoustic wave produces periodic index and surface variations, which in turn deflect a portion of the optical radiation by Bragg diffraction. This process is particularly adaptable to a dielectric film, which forms a surface layer on a substrate, producing a waveguide. In this case the acoustic wave is a surface wave, and the optical radiation is also on the surface of the substrate. The interaction can therefore be achieved with much less acoustic power than in the bulk case, and efficiency is improved. It has been determined that such a device had a maximum observed deflection efficiency of 66% with an electrical input of 2.5 W, or an acoustic power of 0.18 W. Liquid crystals have all the properties that are needed for switching, deflecting, and modulating and are able to combine the advantages of the acoustooptic and electrooptic devices in one compact package.

SUMMARY OF THE INVENTION

This invention makes use of liquid crystals in combination with a solid state medium. It has been determined that liquid crystals may be fabricated into active integrated circuits because the orientation pattern of a given liquid-crystal state is strongly influenced by electric, magnetic, and acoustic fields. Optical waveguides depend upon the index of refraction of the materials used. The average molecular orientation determines the refractive index affecting a given polarization. By suitable molecular reorientation, the effective index of refraction may be varied as desired. The presence or absence of an applied electric field defines two allowed waveguide states by specifying two different index states. If the liquid crystal is the waveguide medium, then light propagating along this medium is subject to two possible index states. If the liquid crystal is used as a boundary medium for the waveguide, the two orientations of the liquid crystal will determine the waveguide boundary conditions. For both cases the two liquid-crystal orientations make possible many active liquid-crystal devices. This specification will set forth different configurations that may be used to form liquid-crystal microoptic devices. It has been determined that liquid crystals may be used as the waveguide boundary, as the waveguide itself and for potential uses in liquid-core fibers. Pertinent properties of liquid-crystals and optical waveguides, the possibilities in the combination of liquid-crystals and optical waveguides as well as the current status of technology for the modulation of light in waveguides and specific liquid-crystal applications have been set forth in NRL Report 7507, dated Nov. 10, 1972, by Joel M. Schnur and Thomas G. Giallorenzi entitled "Prospectus For The Development of Liquid Crystal Waveguides" and is incorporated by reference into this specification.

DESCRIPTION OF THE INVENTION

Figure 1A:
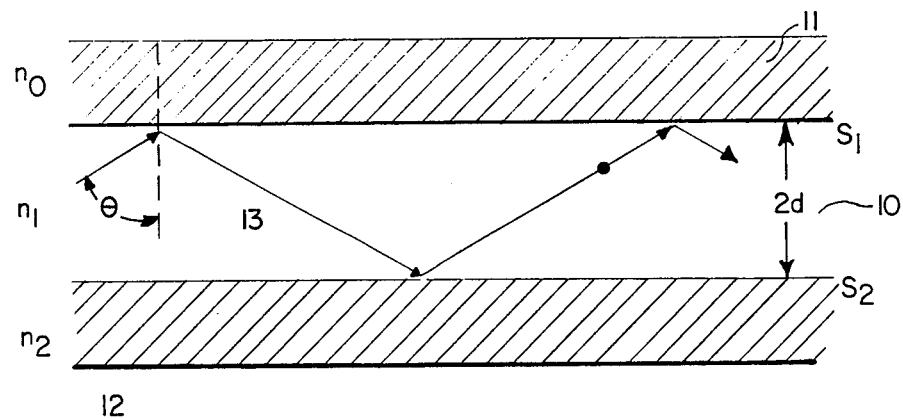
FIG. 1(a) illustrates a well known optical waveguide formed by a high-index dielectric layer between two lower index cladding layers.

Now referring to the drawings, wherein the same reference characters refer to like parts, there is shown in FIG. 1, a prior art optical waveguide formed by solid state dielectric material. As shown, the optical waveguide is formed by a high-index dielectric layer 10 between two lower index cladding layers 11 and 12. The refractive indices are $N_1$, $N_2$ and $N_0$ where $N_1 > N_0$ and $N_2$. The light path through the waveguide is shown by the arrows 13 all of which are incident at the boundaries of layer 10 at the same angle $\theta$ which is the angle of total internal reflection with the boundaries. Such waveguides have been made of different solid state materials. One of the important features is that the waveguide material through which the light travels have a higher index of refraction than the upper and bottom layers. The upper layer may be air.

This invention differs over the prior art by use of a liquid-crystal instead of a solid material.

When some organic substances are melted, instead of becoming a clear liquid, they pass through a turbid fluid state which is termed the mesomorphic or liquid-crystal state. The liquid-crystal state has more order in the arrangement of its molecules than the isotropic liquid state, but less than the solid state.

In general a molecule of a compound which forms a liquid-crystal is elongated, contains a benzene ring, is fairly rigid along a large part of the long axis, is highly polarizable, and contains a permanent dipole.

Three major phases of the mesomorphic or liquid-crystal state have been observed: smectic, cholesteric, and nematic. For each major phase there exist subphases or textures (such as homeotropic, smectic C, and focal conic). Cholesteric phases are noted for their high optical activity, whereas the smectic and nematic phases are generally not optically active.

Figure 1B:
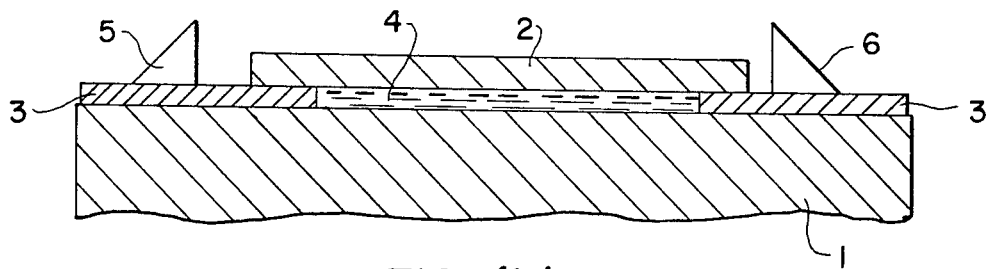
FIG. 1(b) illustrates a cross sectional view of of a liquid crystal waveguide as reported in Applicants' previously mentioned published article.
Figure 1C:
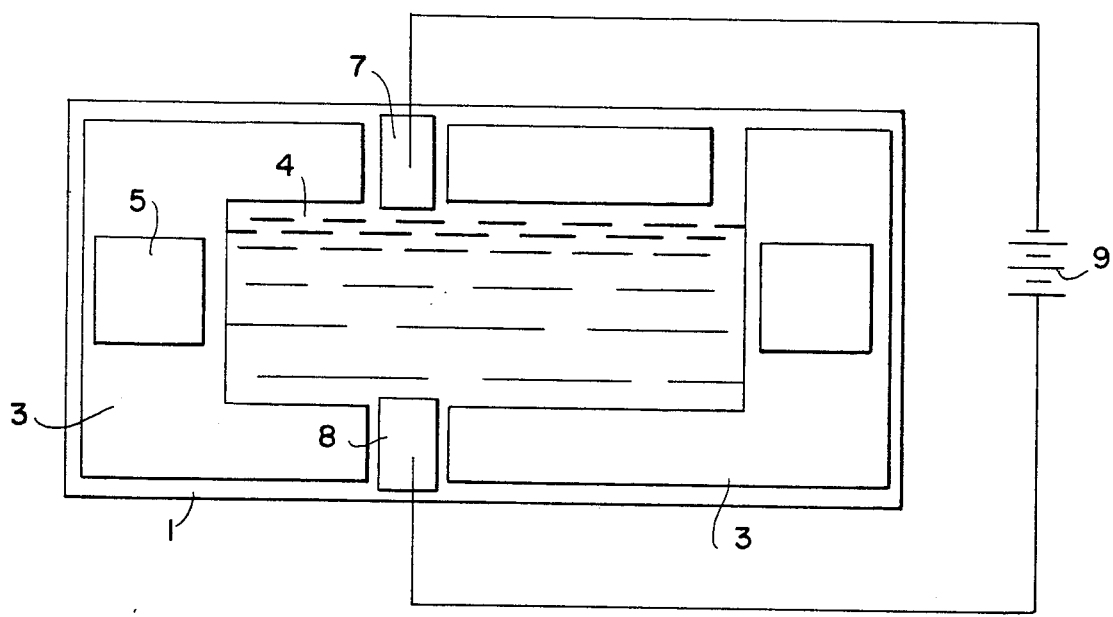
FIG. 1(c) illustrates a top view of the waveguide shown in FIG. 1(b).

FIG. 1(b) and FIG. 1(c) illustrate a nematic liquid-crystal waveguide configuration useful for electro-optic modulation and switching. As shown, the liquid-crystal waveguide includes a polymethylmethacrylate substrate 1 and an upper plate 2, each having an index of refraction of 1.49. The upper plate 2 is separated from the substrate by transparent polymer films or spacers 3 of polyvinylidene chloride having an index of refraction of 1.60 and a thickness of 6 $\mu$. A nematic liquid crystal 4 having an index of refraction from 1.56 to 1.60 and a thickness of 6 $\mu$ in the spacing between the substrate and the upper plate. The liquid-crystal forms the waveguide medium, and is of the nematic type, and is either a mixture of asymmetric azoxybenzenes known as Licristal phase V supplied by E. Merck and Co or MBBA obtained from Eastman Kodak. The liquid crystal was aligned at the interface between the liquid crystal and the polymer film 3 to minimize scattering at this boundary. The upper plate 2 and the substrate 1 were carefully prepared by thoroughly cleaning them and then either (a) firmly rubbing them in one direction with clean dry tissue paper to promote molecular alignment parallel to the substrate (homogeneous alignment), or (b) treating them with a surfactant to promote alignment perpendicular to the substrate (homeotropic alignment). Optical radiation from a He/Ne LASER is coupled into the polymer film by use of a prism 5 on the input end of the waveguide. The radiation travels ½ – 1cm. in the polymer film before impinging on the end of the liquid crystal layer. The radiation coupled into the liquid crystal traverses the liquid crystal along the length thereof through the liquid crystal in a direction parallel with the substrate and upper plate. Output coupling is achieved by terminating the liquid crystal waveguide by an output polymer film 3-prism arrangement such as on the input end. The liquid-crystal waveguide is provided with spaced (1mm apart) electrodes 7 and 8 on opposite sides of the liquid crystal which are electrically connected with a suitable voltage source 9 of about 100 volts DC and less. Amplitude modulation and switching is achieved by the unique electrooptic properties of nematic material wherein the application of electrical stimuli causes dynamic scattering in the thin film liquid crystal which destroys waveguiding. The above described FIG. 1(b) and FIG. 1(c) illustrate liquid-crystal optical waveguide such as used in this invention.

Figure 2:
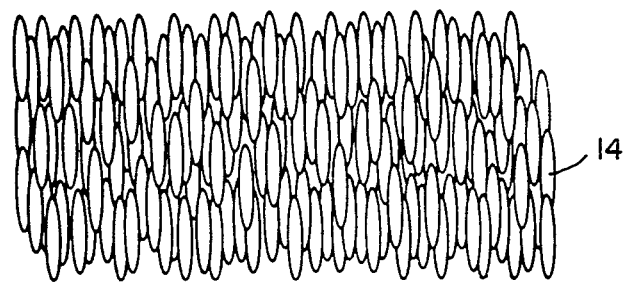
FIG. 2 illustrates the molecular alignment of a nematic liquid-crystal phase.
Figure 3:
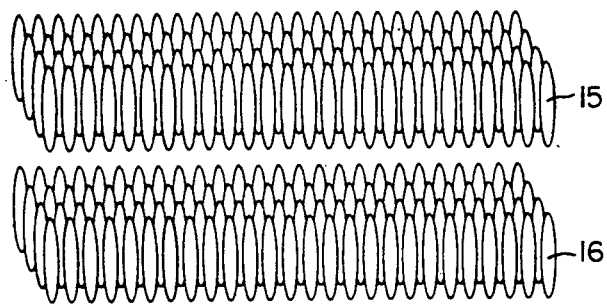
FIG. 3 illustrates the molecular alignment of a smectic liquid crystal phase.
Figure 4:
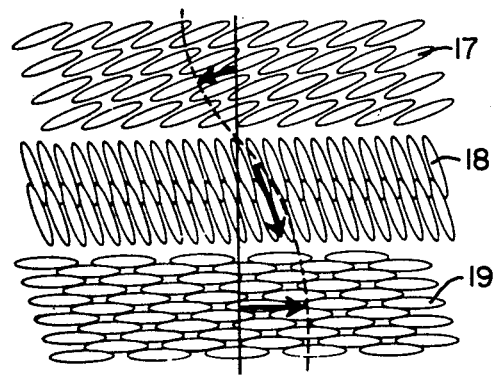
FIG. 4 illustrates the molecular alignment of a cholesteric liquid crystal phase.

Nematic liquid-crystals are composd of long cylindrical molecules 14 which align in a parallel manner. Each molecule can rotate freely only about its long axis but can also have some freedom of movement from side to side or up and down. These are shown by FIG. 2. The smectic liquid crystals have layers which slide over one another. Inside each layer the molecules 15, 16 may align in an ordered manner as shown by FIG. 3 or be randomly distributed. Cholesteric liquid crystals are believed to consist of layers 17, 18, 19 with the alignments in the layers displaced with respect to one another, forming a helical pattern as shown in FIG. 4 thus causing a high optical activity.

Table 1 presents several properties of liquid-crystals that make them attractive as integral components in optical waveguides. The last column in the table is a synopsis of the specific role each effect may have in an optical waveguide system. Each liquid-crystal structure has applications as more than one active device. Though some devices have been fabricated using other materials (such as nitrobenzene as an electrooptic modulator), liquid-crystals provide a class of material capable of performing all desired optical processing functions. Table 1 describes the pertinent liquid-crystal structure, field effects upon the structure, and the resulting waveguide device.

Table I

Properties and Uses of Liquid Crystals in Waveguides

| Mesophase Structure | Effect of the Field on the Liquid Crystal | Field Structure | Optical Properties | | Uses as a Field-Controlled Waveguide device |
|---|---|---|---|---|---|
| | | | Applied Field Off | Applied Field On | |
| Nematic | Regular alignment using $E_z$ and Hy | $E_z$=0 parallel to Hy and E large parallel to walls | Transparent, birefrigent, and small-angle scattering | Index change and Pockel effect, dynamic scattering, mode scattering hydrodynamic instability scattering, molecular reorientation | Phase or amplitude modulation, mode coupling, active lens, active prism, mode switching, mode suppression, output coupling, and spatial switching |
| Nematic and dye | Guest-host interaction | $E_z$=0 randomly aligned to walls and $E_z$ large aligned to field | Linear dichroism | Transparent with isotropy along the z axis | Frequency selection, amplitude modulation, mode selection, and output coupling |
| Nematic and 5% cholesteric | Stored texture | Address molecules parallel to walls | Transparent and birefringent | Intense diffuse wide-angle scattering | Waveguide switch |
| Nematic and smectic | Domain formation | $E_z$=0 parallel to walls and E large produces | Transparent and birefringent uniaxial | Parallel array of cylindrical lenses and index change | Mode suppression, mode switching, and amplitude modulation |

Table I-continued

Properties and Uses of Liquid Crystals in Waveguides

| Mesophase Structure | Effect of the Field on the Liquid Crystal | Field Structure | Optical Properties | | Uses as a Field-Controlled Waveguide device |
|---|---|---|---|---|---|
| | | | Applied Field Off | Applied Field On | |
| | | liquid rotation | positive | | |
| Cholesteric | Dilation of helix undisturbed cholesteric | $E_z=0$ domain parallel to walls and $E_x$ large domain parallel to field | Birefringent and uniaxial negative Bragg or Raman-Nath diffraction | Decreased birefringence and decreased diffraction angles | Phase modulation, fr frequency modulation, mode coupling, mode switching, frequency selection, phase matching (i.e., frequency coupling) and output coupling |
| Cholesteric (subphase is Grand Jean plane texture) | Surface deformation | Helix reorientation and mass transport along field gradients | Bragg diffraction (dispersive reflection | Altered reflection from deformed areas | Same as the item above plus acoustically coupled modulation |
| Cholesteric and Dye | Surface deformation | same as the item above | Same as the item above | Same as the item above | Same as the item above, plus mode gain (internal-feedback laser), frequency modulation, amplitude modulation, and light interrogation to determine the state of information transfer |

Figure 5:
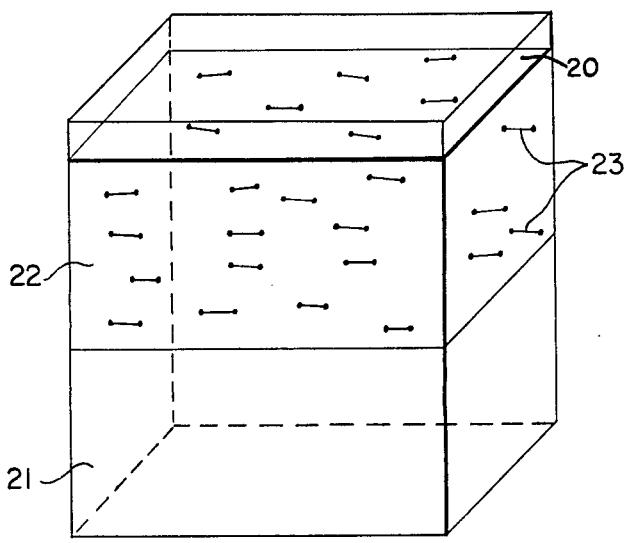
FIG. 5 illustrates a substrate in combination with a liquid-crystal through which light is guided.

FIG. 5 represents one form of a liquid-crystal waveguide. As shown, the waveguide includes an upper plate 20 spaced from a substrate 21 formed of a material such as glass or polymethylmethacrylate having an index of refraction of 1.49. The liquid-crystal 22 is placed between the plate 20 and the substrate and incident light is guided through the liquid-crystal layer similar to that of a solid state waveguide of the prior art. In this arrangement the molecules 23 will be aligned, as shown. It has been determined that a glass layer may be placed upon the substrate between the substrate and the liquid crystal to change the characteristics of the waveguide.

Figure 6:
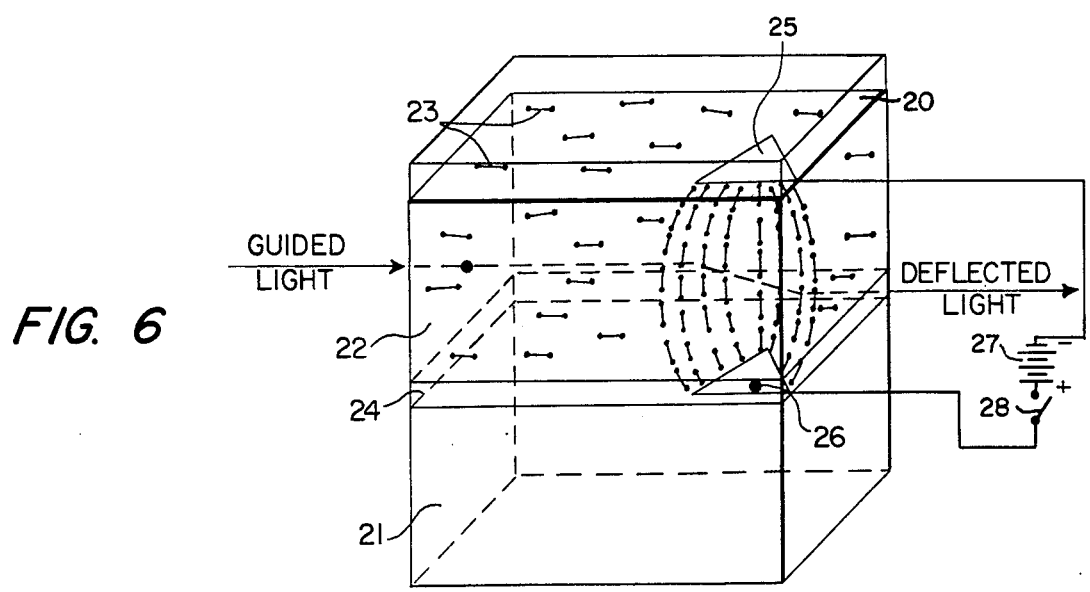
FIG. 6 illustrates a liquid-crystal waveguide with prism shaped electrodes thereon to which an electric field is applied.

FIG. 6 illustrates a liquid crystal waveguide such as shown in FIG. 5 which is shown with the glass layer 24, and with electrodes 25,26 on opposite sides of the liquid crystal, to which an electrical current may be applied by a source 27 controlled by switch 28. Application of an electrical current produces an electric-field between the electrodes which changes the index of refraction and which causes the liquid-crystal molecules 23 to align with the electric field. Change of the index of refraction and alignment of the molecules in a different arrangement functions to deflect the light to a different path. The electrodes may be of specific desired shapes, they may be placed along the sides of the liquid-crystal, and more than one aligned pair may be used of the same or different shape for controlling the light. The change in light path depends on the field strength and the index of refraction change of the liquid-crystal.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A liquid crystal optical waveguide, which comprises
   a transparent substrate,
   a transparent plate spaced from said substrate parallel therewith,
   a liquid crystal waveguide medium placed between said transparent substrate and said transparent plate in surface contact therewith and having an index of refraction greater than that of said substrate and said plate,
   means to apply an electric field to said liquid crystal to cause dynamic scattering,
   means to couple light into said liquid crystal waveguide medium so that the light is guided through the liquid crystal medium between said substrate and said transparent plate in a direction paralleling said substrate and said plate, and
   means to couple light out of said liquid crystal medium.

2. A liquid-crystal optical waveguide as claimed in claim 1; wherein,
   said means to apply an electrical field to said liquid medium is one pair of oppositely disposed electrodes fixed relative to said liquid-crystal medium.

3. A liquid-crystal optical waveguide as claimed in claim 2; which includes,
   an electrical source for applying an electrical field between said pairs of electrodes.

4. A liquid-crystal optical waveguide as claimed in claim 3; in which,
   the electrical field between each pair of electrodes is variable.

5. A liquid-crystal optical waveguide as claimed in claim 1; which includes,
   means for aligning said liquid-crystal to said substrate.

6. A liquid-crystal optical waveguide as claimed in claim 5; wherein,
   means for aligning said liquid-crystal to said substrate is a monolayer of surfactant.

7. A liquid-crystal optical waveguide as claimed in claim 1; in which,
   said liquid-crystal is nematic.

* * * * *